United States Patent
Hinque et al.

(10) Patent No.: US 8,746,306 B2
(45) Date of Patent: *Jun. 10, 2014

(54) SELF-INFLATING TIRE

(75) Inventors: Daniel Paul Luc Marie Hinque, Habay-la-Neuve (BE); Lois Levy, Luxembourg (LU); Gilles Bonnet, Niederfeulen (LU)

(73) Assignee: The Goodyear Tire & Rubber Company, Akron, OH (US)

( * ) Notice: Subject to any disclaimer, the term of this patent is extended or adjusted under 35 U.S.C. 154(b) by 279 days.

This patent is subject to a terminal disclaimer.

(21) Appl. No.: 13/292,460

(22) Filed: Nov. 9, 2011

(65) Prior Publication Data
US 2013/0112328 A1    May 9, 2013

(51) Int. Cl.
*B60C 23/12*    (2006.01)

(52) U.S. Cl.
USPC .......................................... 152/426; 152/419

(58) Field of Classification Search
USPC .......... 152/415, 418, 419, 423, 424, 425, 426
See application file for complete search history.

(56) References Cited

U.S. PATENT DOCUMENTS

| | | | |
|---|---|---|---|
| 4,922,984 A * | 5/1990 | Dosjoub et al. ............... | 152/415 |
| 7,117,910 B2 * | 10/2006 | Akahori ......................... | 152/426 |
| 8,042,586 B2 * | 10/2011 | Losey et al. ................... | 152/426 |
| 8,113,254 B2 * | 2/2012 | Benedict ........................ | 152/426 |
| 8,186,402 B2 * | 5/2012 | Eigenbrode .................... | 152/415 |
| 8,235,081 B2 * | 8/2012 | Delgado et al. ............... | 152/419 |
| 8,291,950 B2 * | 10/2012 | Hinque et al. ................. | 152/426 |
| 8,322,036 B2 * | 12/2012 | Delgado et al. ............ | 29/894.37 |
| 8,381,785 B2 * | 2/2013 | Losey ............................ | 152/450 |
| 8,534,335 B2 * | 9/2013 | Benedict ........................ | 152/426 |
| 8,550,137 B2 * | 10/2013 | Delgado et al. ............... | 152/539 |
| 2013/0048178 A1 * | 2/2013 | Hinque ......................... | 152/450 |

FOREIGN PATENT DOCUMENTS

WO   WO03049958 A1 *  6/2003
WO   WO 2010008338 A1 *  1/2010

* cited by examiner

*Primary Examiner* — Kip T Kotter
(74) *Attorney, Agent, or Firm* — June E. Rickey

(57) ABSTRACT

A self-inflating tire assembly includes an air tube connected to a tire and defining an air passageway, the air tube being composed of a flexible material operative to allow an air tube segment opposite a tire footprint to flatten, closing the passageway, and resiliently unflatten into an original configuration. The air tube is sequentially flattened by the tire footprint in a direction opposite to a tire direction of rotation to pump air along the passageway to an inlet device for exhaust from the passageway or to an outlet device for direction into the tire cavity. The inlet device is positioned within the annular passageway 180 degrees opposite the outlet device such that sequential flattening of the air tube by the tire footprint effects pumping of air along the air passageway with the tire rotating in either a forward or reverse direction of rotation. The invention further includes an outlet device for regulating the tire cavity pressure and flow into the cavity.

9 Claims, 9 Drawing Sheets

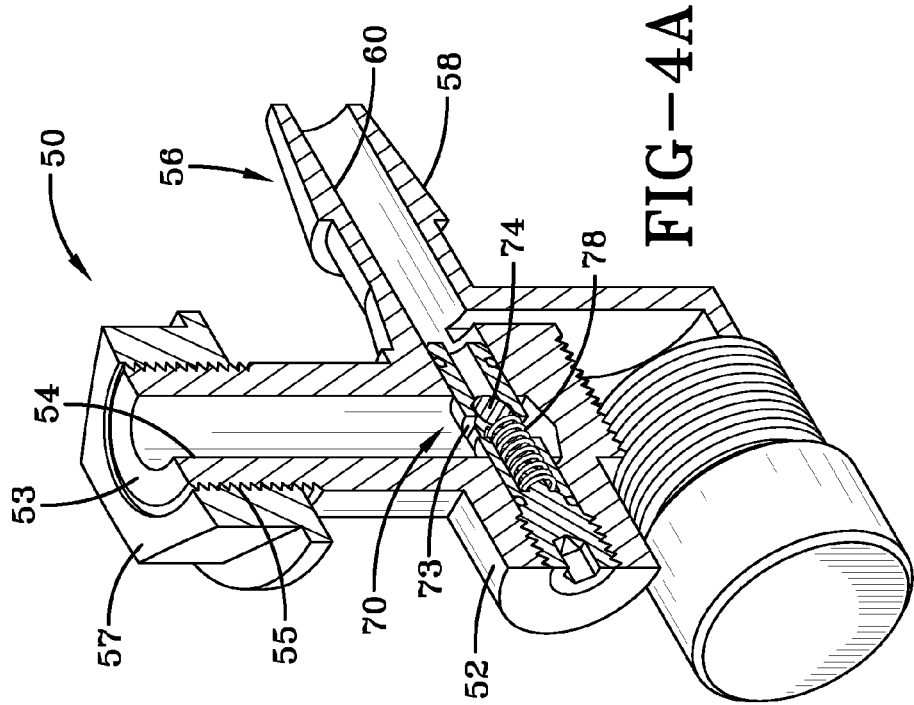
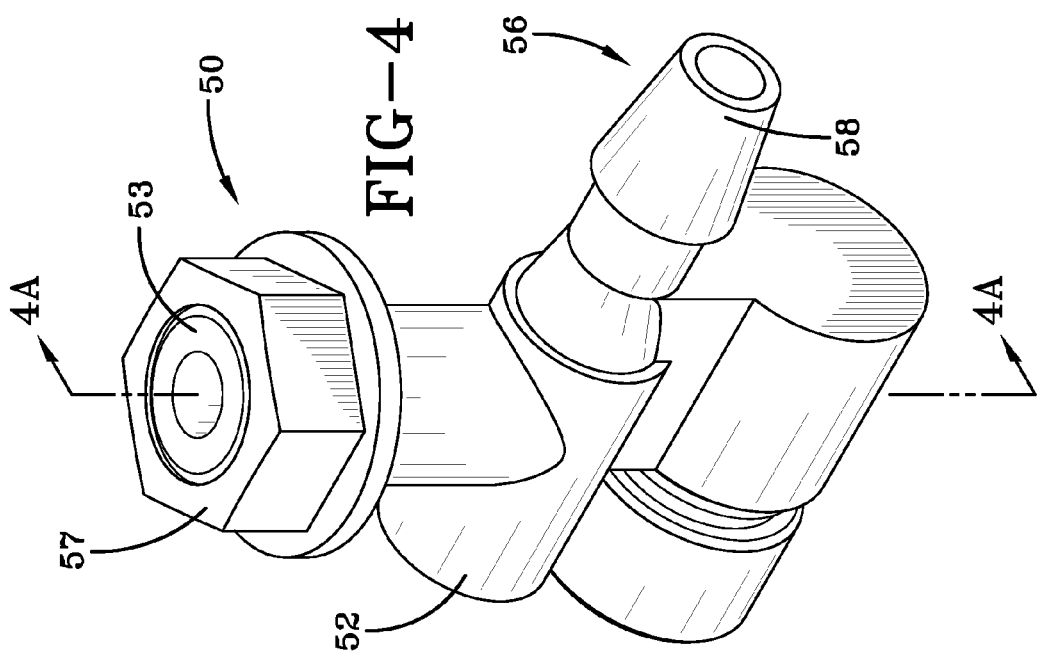

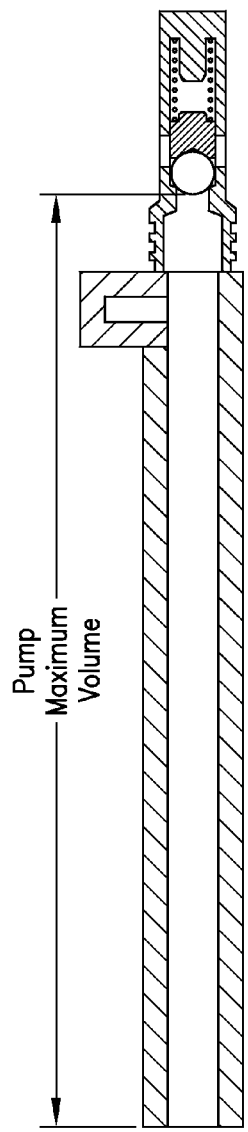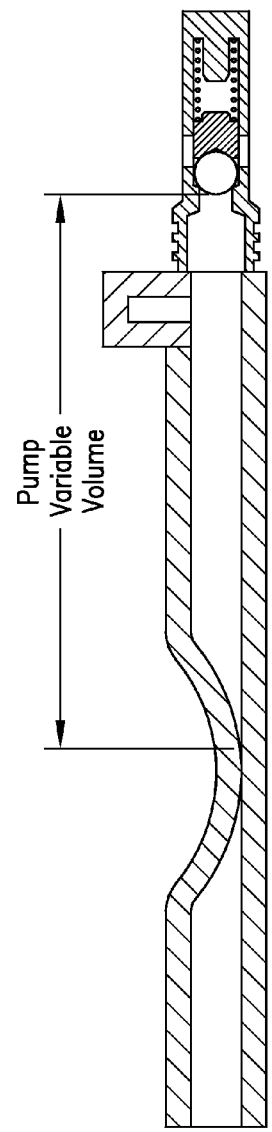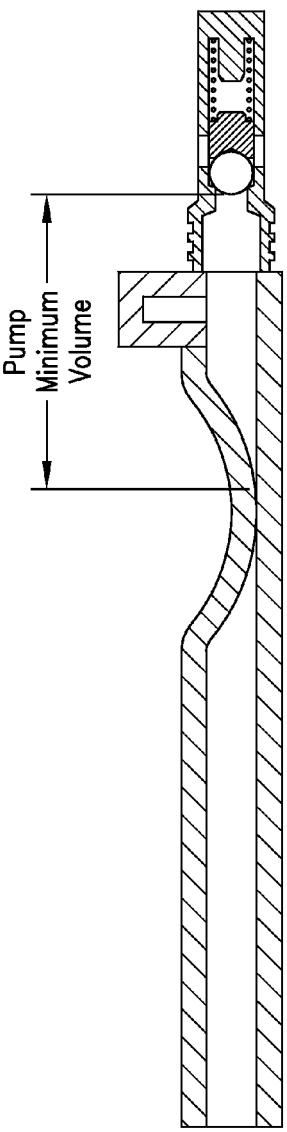

SELF-INFLATING TIRE

FIELD OF THE INVENTION

The invention relates generally to self-inflating tires and, more specifically, to a pump mechanism for such tires.

BACKGROUND OF THE INVENTION

Normal air diffusion reduces tire pressure over time. The natural state of tires is under inflated. Accordingly, drivers must repeatedly act to maintain tire pressures or they will see reduced fuel economy, tire life and reduced vehicle braking and handling performance. Tire Pressure Monitoring Systems have been proposed to warn drivers when tire pressure is significantly low. Such systems, however, remain dependant upon the driver taking remedial action when warned to re-inflate a tire to recommended pressure. It is a desirable, therefore, to incorporate a self-inflating feature within a tire that will self-inflate the tire in order to compensate for any reduction in tire pressure over time without the need for driver intervention.

SUMMARY OF THE INVENTION

The invention provides in a first aspect a self-inflating tire assembly including a tire mounted to a rim. The tire having a tire cavity, first and second sidewalls extending respectively from first and second tire bead regions to a tire tread region and an air tube connected to the tire and being composed of a flexible material operative to allow a portion of the air tube segment near a tire footprint to substantially open and close the air tube. The invention further includes a regulator device connected to an end of the air tube, the regulator device having a regulator body mounted in the tire sidewall, the regulator body having first end located within the tire cavity, wherein the first end has an internal passageway that is in fluid communication with the tire cavity, said regulator device having a second end having an internal pump passageway for connecting to an end of the air tube; a check valve in fluid communication with the internal passageway and the pump passageway, wherein the regulator device further comprises a channel located between the second end and the check valve, wherein the channel is in fluid communication with a buffer chamber.

Definitions

"Aspect ratio" of the tire means the ratio of its section height (SH) to its section width (SW) multiplied by 100 percent for expression as a percentage. "Asymmetric tread" means a tread that has a tread pattern not symmetrical about the center plane or equatorial plane EP of the tire.

"Axial" and "axially" means lines or directions that are parallel to the axis of rotation of the tire.

"Buffer volume" means the pump minimum volume.

"Chafer" is a narrow strip of material placed around the outside of a tire bead to protect the cord plies from wearing and cutting against the rim and distribute the flexing above the rim.

"Circumferential" means lines or directions extending along the perimeter of the surface of the annular tread perpendicular to the axial direction.

"Equatorial Centerplane (CP)" means the plane perpendicular to the tire's axis of rotation and passing through the center of the tread.

"Footprint" means the contact patch or area of contact of the tire tread with a flat surface at zero speed and under normal load and pressure.

"Inboard side" means the side of the tire nearest the vehicle when the tire is mounted on a wheel and the wheel is mounted on the vehicle.

"Lateral" means an axial direction.

"Lateral edges" means a line tangent to the axially outermost tread contact patch or footprint as measured under normal load and tire inflation, the lines being parallel to the equatorial centerplane.

"Net contact area" means the total area of ground contacting tread elements between the lateral edges around the entire circumference of the tread divided by the gross area of the entire tread between the lateral edges.

"Non-directional tread" means a tread that has no preferred direction of forward travel and is not required to be positioned on a vehicle in a specific wheel position or positions to ensure that the tread pattern is aligned with the preferred direction of travel. Conversely, a directional tread pattern has a preferred direction of travel requiring specific wheel positioning.

"Outboard side" means the side of the tire farthest away from the vehicle when the tire is mounted on a wheel and the wheel is mounted on the vehicle.

"Peristaltic" means operating by means of wave-like contractions that propel contained matter, such as air, along tubular pathways.

"Peristaltic pump tube" means a tube formed or molded in a tire or an embedded tube which may be inserted post cure or pre-cure.

"Pump minimum volume" or "buffer volume" means the smallest value of the pump variable volume.

"Pump maximum volume" means the volume of fluid located between the peristaltic pump tube inlet and the outlet valve.

"Pump variable volume" means the volume of fluid located between the pinched tube path and the entry of the outlet valve.

"Radial" and "radially" means directions radially toward or away from the axis of rotation of the tire.

BRIEF DESCRIPTION OF THE DRAWINGS

The invention will be described by way of example and with reference to the accompanying drawings in which:

FIG. 4 is a perspective view of a first embodiment of a pump valve mechanism of the present invention.

FIG. 4a is a partial section view through the pump valve of FIG. 4 in the direction 4A-4A.

FIGS. 6A, 6B and 6 C represent an illustration of the pump maximum volume, the pump variable volume, and the buffer or pump minimum value.

DETAILED DESCRIPTION OF THE INVENTION

Figure 1:
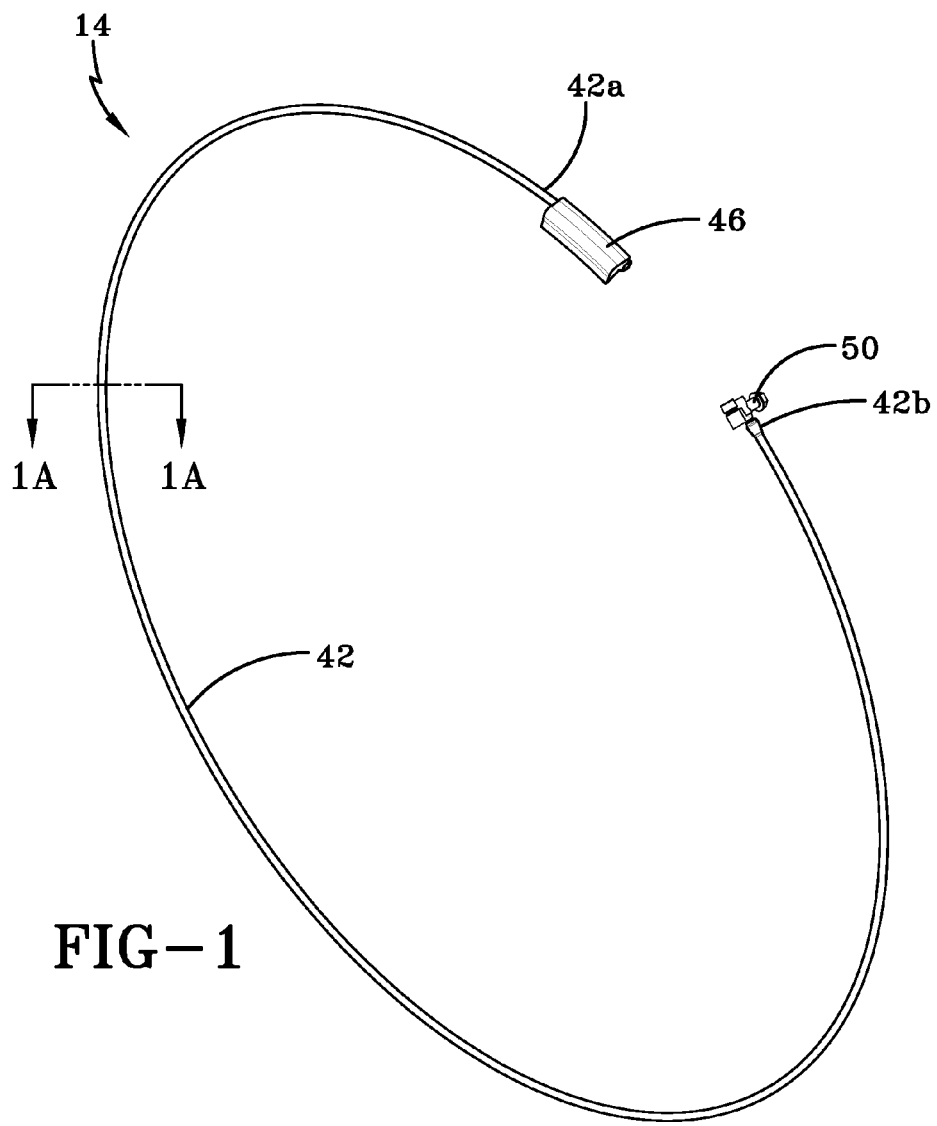
FIG. 1 is an isometric view of the valve, tube and filter for a peristaltic pump assembly.
Figure 1A:
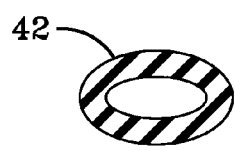
FIG. 1A is a cross-sectional view of the pump tube.
Figure 2A:
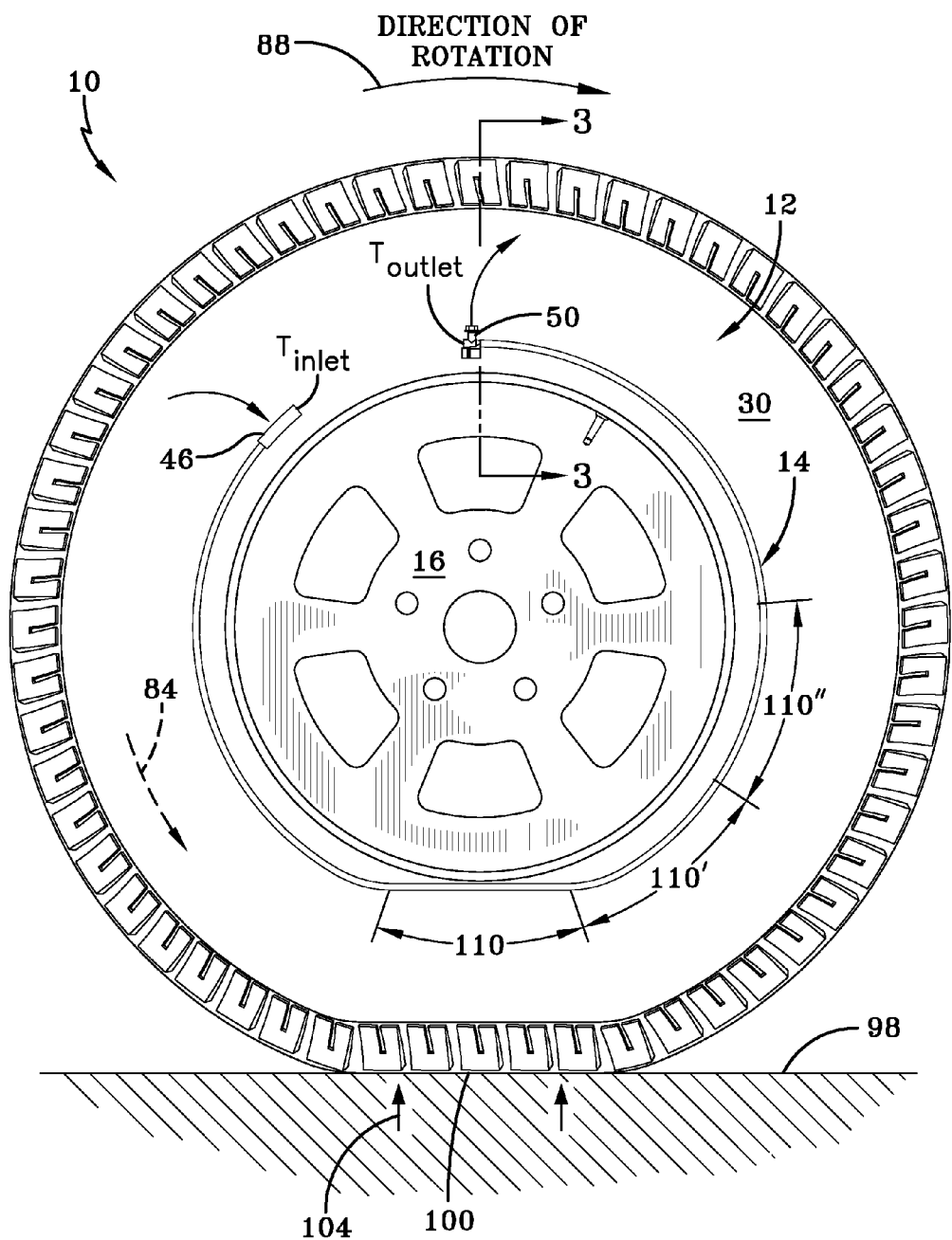
FIG. 2A is a side view of the assembly of FIG. 1 shown mounted in a tire.
Figure 2B:
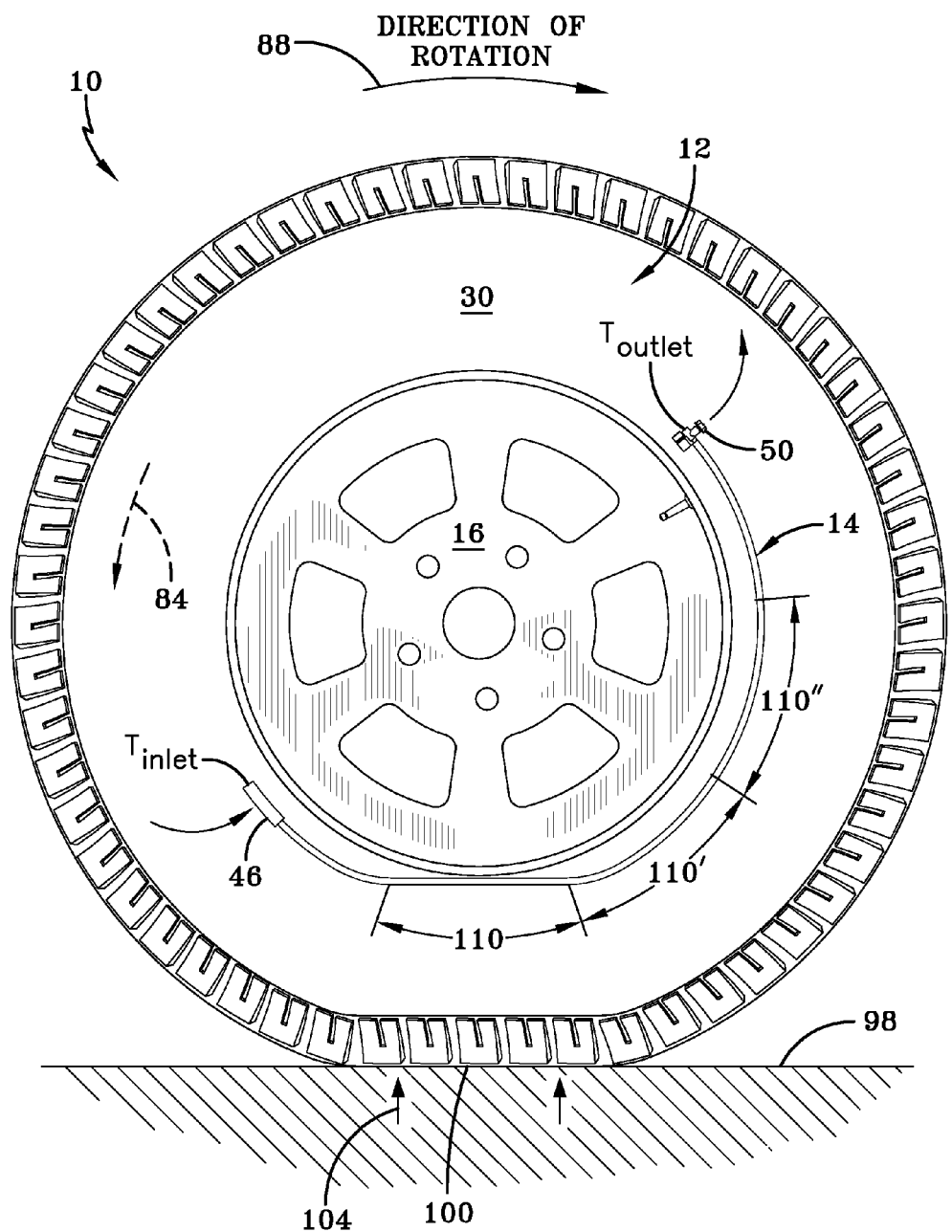
FIG. 2B is a side view of the assembly of FIG. 1 shown mounted in a tire, with the inlet device shown 180 degrees apart from the outlet device.
Figure 2C:
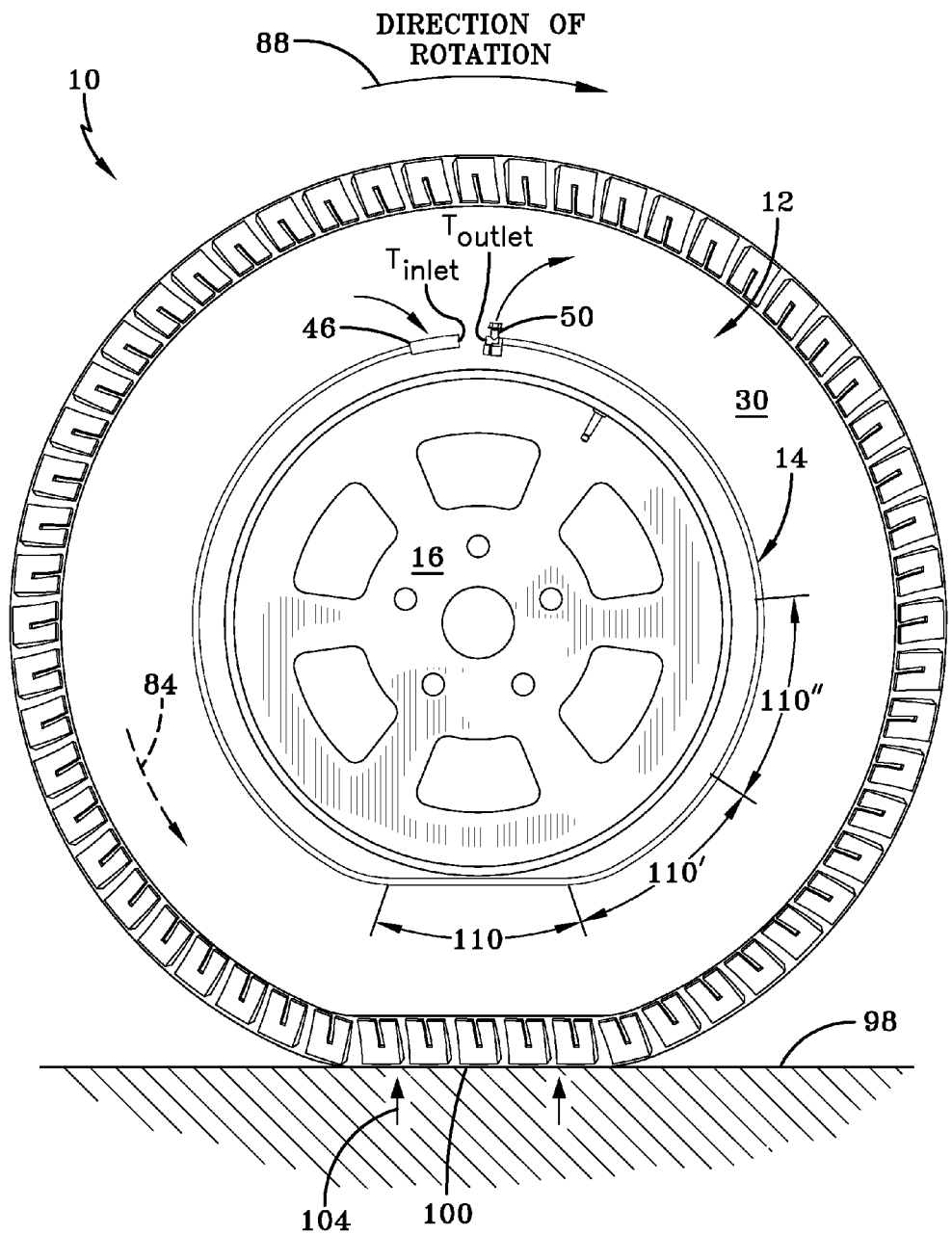
FIG. 2C is a side view of the assembly of FIG. 1 shown mounted in a tire, with the inlet device shown 360 degrees apart from the outlet device.
Figure 3:
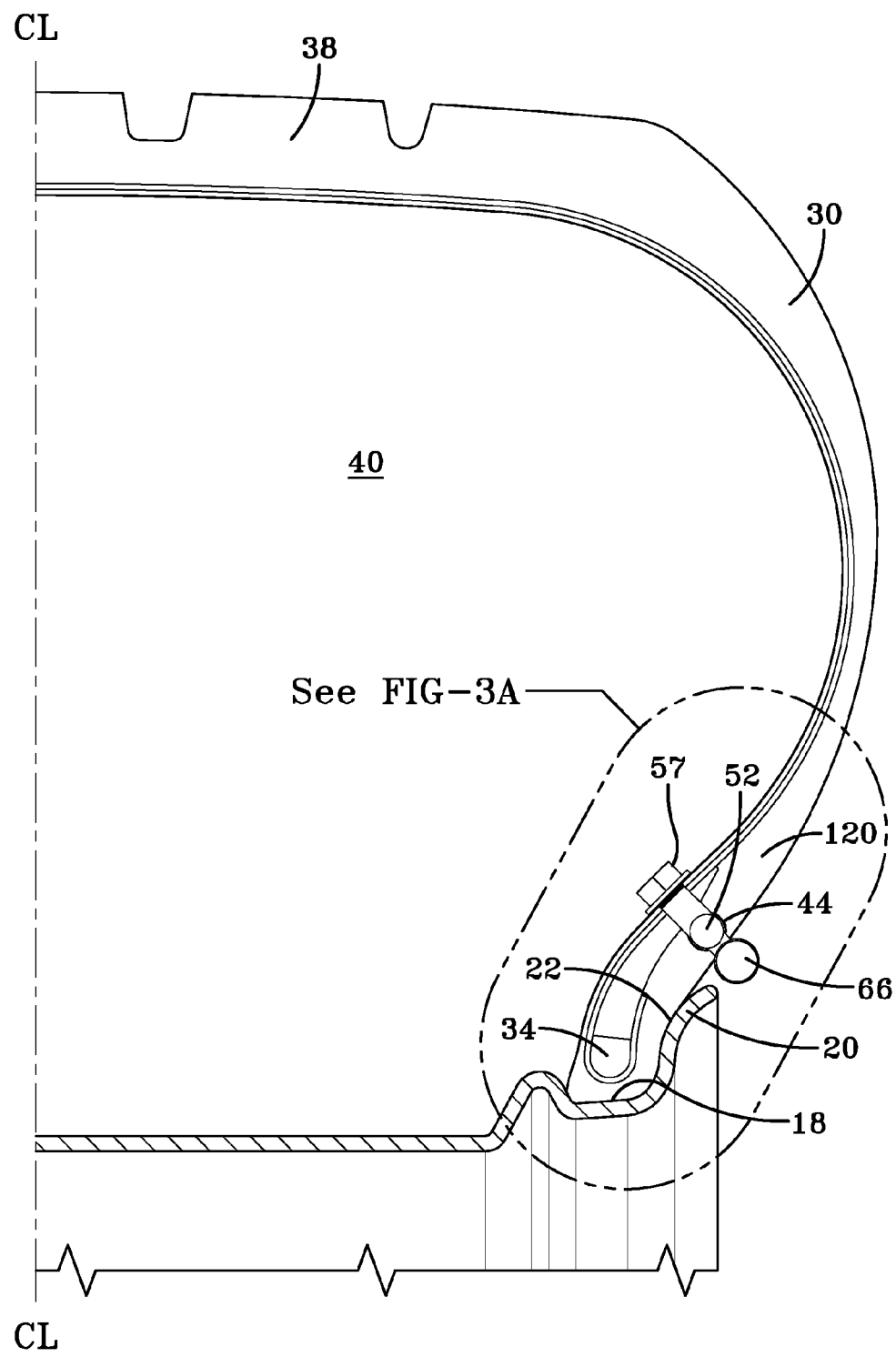
FIG. 3 is an enlarged partial cross sectional view of the tire and rim assembly with the pump valve mechanism shown mounted in the tire.

Referring to FIGS. 1 through 3, a tire assembly 10 includes a tire 12, a peristaltic pump assembly 14, and a tire rim 16. The tire mounts in a conventional fashion to a pair of rim mounting surfaces 18 located adjacent outer rim flanges 20. The outer rim flanges 20 have an outer rim surface 22 that engages the bead area of the tire. The tire is of conventional construction, having a pair of sidewalls 30 extending from opposite bead areas 34 to a crown or tire tread region 38. The tire and rim enclose a tire cavity 40.

As shown in FIGS. 1-2, the peristaltic pump assembly 14 includes a pump tube 42 that is mounted in a tire passageway 44, which is preferably located in the sidewall area of the tire, preferably near the bead region. The tire passageway is preferably molded into the sidewall of the tire during vulcanization and is preferably annular in shape. The pump tube 42 has a first end 42a joined together by an inlet device 46 and a second end 42b joined together with an outlet device 50. The pump tube 42 is comprised of a tube formed of a resilient, flexible material such as plastic, silicone, elastomer or rubber compounds, and is capable of withstanding repeated deformation cycles when the tube is deformed into a flattened condition subject to external force and, upon removal of such force, returns to an original condition generally circular in cross-section. The tube is of a diameter sufficient to operatively pass a volume of air sufficient for the purposes described herein and allowing a positioning of the tube in an operable location within the tire assembly as will be described. Preferably, the tube has a circular cross-sectional shape, although other shapes such as elliptical or lens shape may be utilized. Alternatively, the passageway 44 molded or formed into the tire sidewall may serve as the pump tube 42.

As shown in FIG. 2, the inlet device 46 and the outlet device 50 are spaced apart a desired distance typically in the range of approximately 90 degrees or more, typically about 180 degrees to 360 degrees. If 180 degrees is selected, two 180 degree pumps may be used. The inlet and outlet device may be located adjacent each other, thus forming a single 360 degree pump. Other variations may be utilized, such as 270 degrees, etc.

The inlet device 46 in its simplest form may be the inlet tube end exposed to the atmosphere. The inlet device may optionally comprise a check valve and/or an optional filter. The outlet device 50 is a pressure and flow regulating device, and regulates the tire cavity maximum pressure. The outlet device 50 also functions to regulate the flow into and out of the tire cavity. The outlet device is described in more detail, below.

As will be appreciated from FIG. 2, the inlet device 46 and the outlet device 50 are in fluid communication with the circular air tube 42. As the tire rotates in a direction of rotation 88, a footprint 100 is formed against the ground surface 98. A compressive force 104 is directed into the tire from the footprint 100 and acts to flatten a segment 110 of the pump 42. Flattening of the segment 110 of the pump 42 forces a portion of air located between the flattened segment 110 and the outlet device 50, in the direction shown by arrow 84 towards the outlet device 50. The portion of air will then regulated through the outlet device 50. If the pressure at the inlet of the outlet device is sufficiently high, the internal valve will open and fill the tire cavity, as described in more detail, below.

As the tire continues to rotate in direction 88, the previously flattened tube segments 110, 110', 110" will be sequentially refilled by atmospheric air flowing into the inlet device 46 along the pump tube 42. The inflow of air from the inlet device 46 continues until the outlet device 50 rotating counterclockwise as shown with the tire rotation 88, passes the tire footprint 100.

The location of the peristaltic pump assembly will be understood from FIGS. 2-4. In one embodiment, the peristaltic pump assembly 14 is positioned in the tire sidewall, radially outward of the rim flange surface 26 in the chafer 120. So positioned, the air tube 42 is radially inward from the tire footprint 100 and is thus positioned to be flattened by forces directed from the tire footprint as described above. The segment 110 that is opposite the footprint 100 will flatten from the compressive force 114 from the footprint 100 pressing the tube segment against the rim flange surface 26. Although the positioning of the tube 42 is specifically shown as between a chafer 120 of the tire at the bead region 34 and the rim surface 26, it is not limited to same, and may be located at any region of the tire such as anywhere in the sidewall or tread. The diametric sizing of the peristaltic pump air tube 42 is selected to span the circumference of the rim flange surface 26.

Pressure Regulating Outlet Device

Figure 3A:
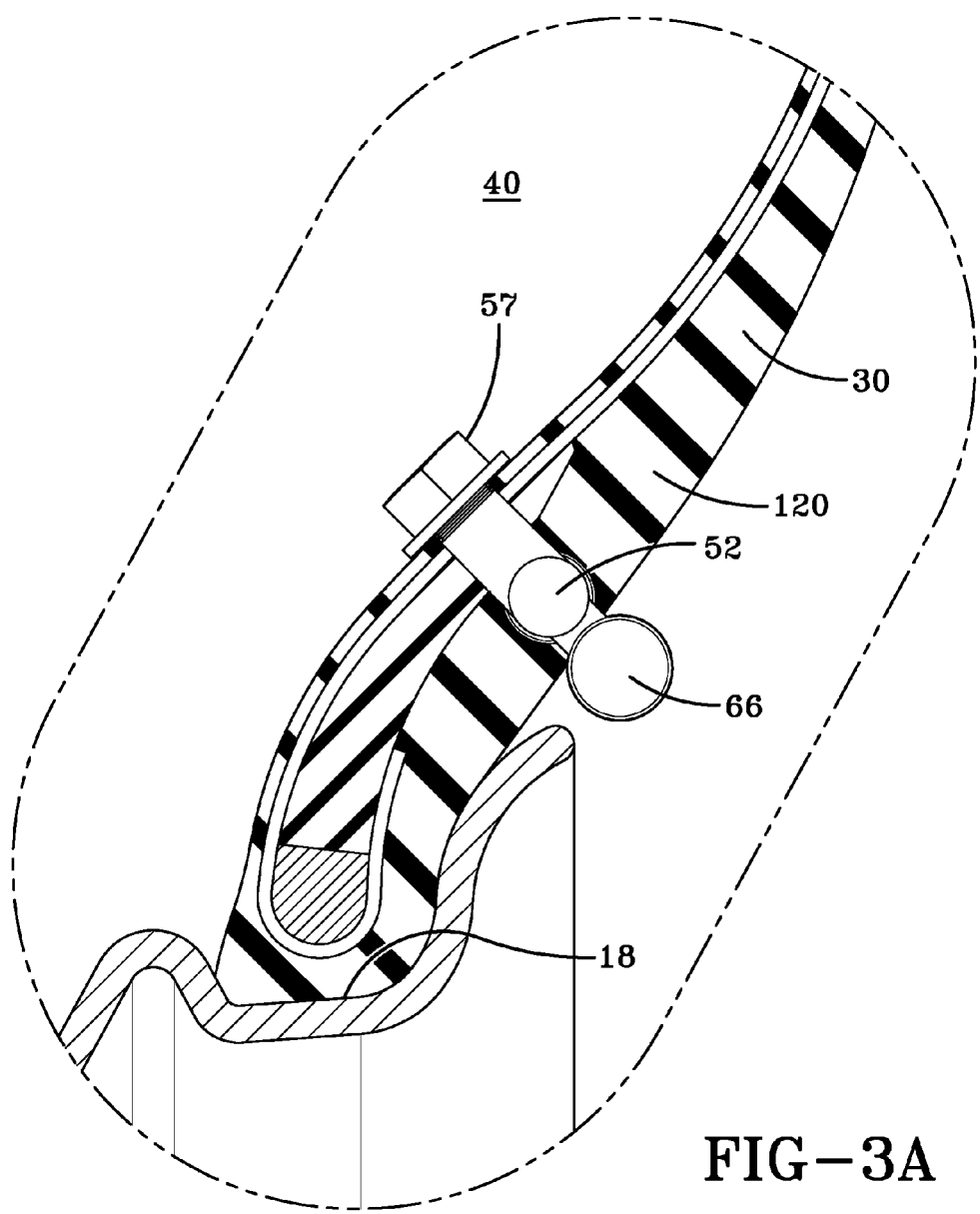
FIG. 3A is an enlarged perspective view of the pump valve mechanism of FIG. 3.
Figure 5A:
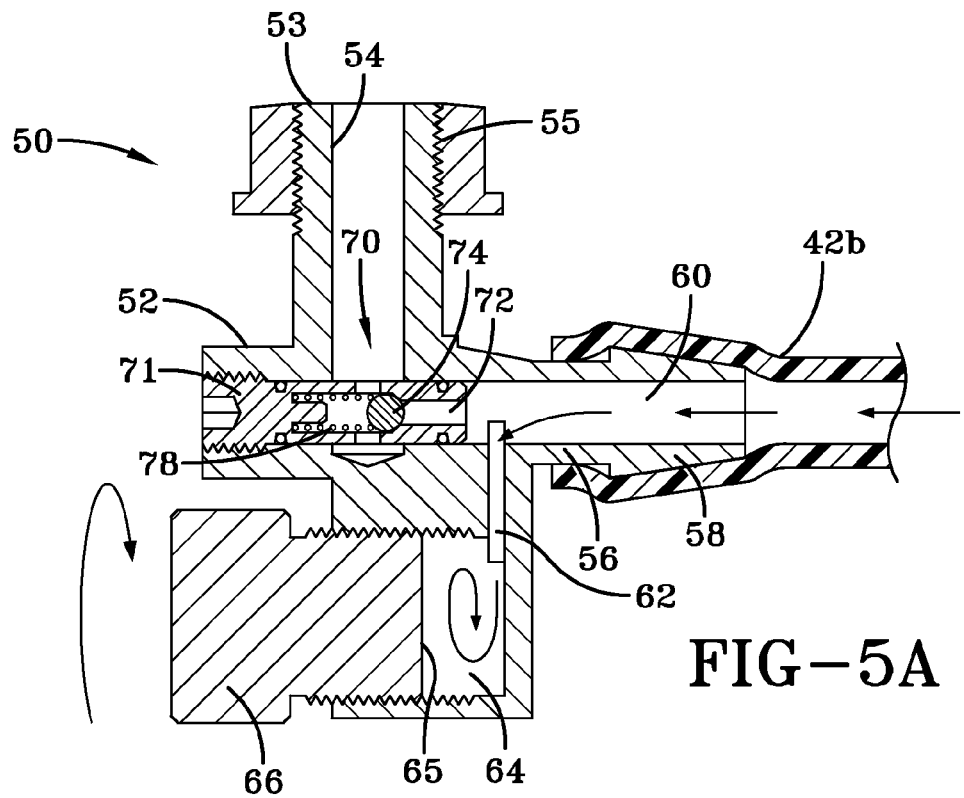
FIGS. 5A and 5B are cross-sectional views of the pump valve in operation, in the closed position and the open position, respectively.
Figure 5B:
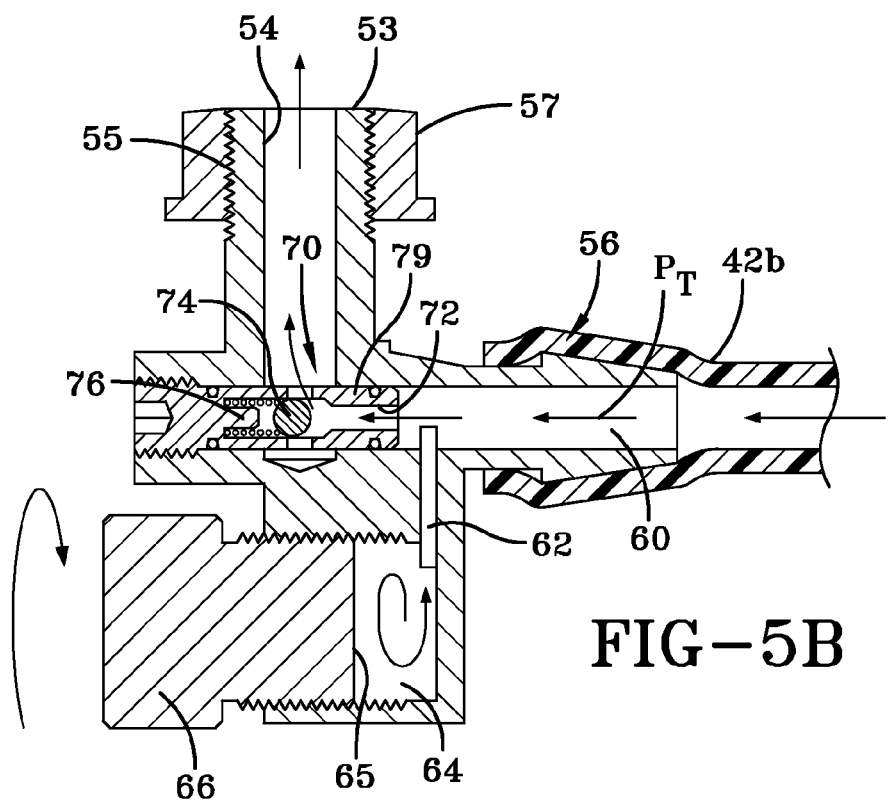

The outlet device 50 is a pressure and flow regulating device, and regulates the tire cavity maximum pressure. The outlet device 50 also functions to regulate the flow into and out of the tire cavity. The outlet device has a valve body 52 having a first end 53 having a first interior passageway 54. The first end of the outlet device is mounted through the tire sidewall as shown in FIGS. 3, 3A so that the first interior passageway is in fluid communication with the tire cavity. The first end has a threaded region 55 for receiving a nut 57 thereon in order to secure the outlet device to the tire sidewall. The outlet device further comprises a second end 56 preferably orthogonal to said first end. The second end optionally includes a flared fitting 58 for receiving the pump outlet tube 42b thereon. The second end has a pump passageway 60. The first interior passageway 54 and the pump passageway 60 intersect with each other. A check valve 70 is positioned at the intersection of the two passageways 54, 60. The check valve 70 has a housing 71 with an interior flow duct 72 that is aligned with the pump passageway 60. The flow duct 72 has an opening 73 for communicating fluid between the first and second interior passageways 56, 60. The check valve 70 further comprises a ball 74 mounted in a slideable piston 76. The ball/piston slide in duct 72. A spring 78 mounted within the check valve housing biases the ball/piston member in the closed position, so that flow from the second interior passageway 60 cannot communicate with the first passageway 54, and vice versa. The check valve 70 further comprises a stop 79 to retain the ball/piston member within the duct 72.

The outlet device further includes a channel 62 that extends between the pump passageway 60 and an adjustable buffer volume chamber 64. The channel 62 is located between the check valve and the pump end 42b. The buffer volume chamber 64 is formed in the valve body 52 and preferably has an adjustable outer wall 65. The adjustable outer wall 65 may be formed from the flat end of a threaded fastener such as a threaded bolt. The outer wall 65 may be adjusted by turning the screw within the threaded passageway to expand or contract the buffer volume chamber. When the check valve is closed, air from the pump fills the buffer volume chamber.

The maximum air pressure delivered by the peristaltic pump can be fixed by setting the volume of the pump tube and the buffer volume located between the end of the tube and the check valve and the adjustable buffer chamber. The maximum pump tube volume is selected by design with the tube dimensions and the tube length. The buffer volume can also be set by design. The air in the buffer volume chamber is not compressed, but functions to tune or adjust the maximum air pressure of the pump system. The buffer volume acts as a storage chamber for accumulating air mass for transfer to the tire cavity. Increasing the buffer volume will decrease the tire pressure, while decreasing the buffer volume will increase the tire cavity pressure. Thus, by adjusting the buffer volume, one can adjust the desired tire final pressure.

The operation of the system and the outlet device can now be described. As shown in FIG. 2, the tire rotates in a direction of rotation 88, and a footprint 100 is formed against the ground surface 98. A compressive force 104 is directed into the tire from the footprint 100 and acts to flatten a segment 110 of the pump 42. Flattening of the segment 110 of the pump 42 forces a portion of air located between the flattened segment 110 and the outlet device 50, in the direction shown by arrow 84 towards the outlet device 50. The portion of air will then be regulated through the outlet device 50. If the pressure at the entrance 60 of the outlet device is sufficiently high, the fluid pressure will overcome the spring pressure 78 (cracking pressure), thus opening the internal check valve. Thus fluid from the pump will flow from the pump passageway 60 through the hole 73 and into the first passageway 54 and then into the tire cavity 44, as described in more detail, below.

If the pressure in the pump tube 42b is less than the tire pressure, the check valve will be closed. The check valve 70 when closed, blocks flow from communicating from the pump passageway 60 into the tire cavity, and also prevents back flow from the tire cavity into the pump 42. When the check valve is closed, the pump compresses the air in the pump tube 42. Air from the pump tube enters the channel 62 of the outlet device, and then enters the buffer volume chamber 64. The buffer volume chamber will fill while the check valve remains closed. When the pressure in the inlet 60 of the outlet device exceeds the cracking pressure, the check valve opens and will fill the tire cavity. The check valve will close when the inlet pressure $P_{T\,falls}$ below the cracking pressure. The cycle of opening and closing the check valve will allow the tire cavity to be filled as the tire rotates a specified distance. The buffer volume may be adjusted by turning the screw 66. Increasing the buffer volume results in a decrease of tire final pressure, while decreasing the buffer volume results in an increase of the tire final pressure. The advantage of having an adjustable buffer volume allows the maximum system pressure of the tire cavity to be tuned for a specific tire.

The table below indicates exemplary tires, all having the same internal tire volume of 38 L and initial tire pressure of 1.8 Bar. All of the exemplary pumps have a circumferential length of 180 degrees. Examples 1 and 2 have a pump size of 2×1 with a pump volume of 1036 mm3. For example 1 the buffer volume is selected to be 459 mm3, resulting in a desired final tire pressure of 2.2 bar. A distance of 241 km is needed to achieve the final tire pressure. If the buffer volume is decreased to 351 mm3, with all other variables being equal, the final tire pressure will be 2.9 bar (Ex. 2) as compared to 2.2 bar for Ex. 1. A longer distance of 490 km will be needed to achieve a higher final tire pressure of 2.9 bar.

Examples 3 and 4 illustrate a smaller tube size resulting in a smaller pump volume of 700 mm3. For a buffer volume of 310 mm3 (Ex 3) results in a final tire pressure of 2.2 bar and a needed distance of 355 km to achieve the final tire pressure. Ex 4 illustrates all the properties of Ex. 3, except for a smaller buffer volume of 237 mm3, resulting in a higher final tire pressure of 2.9 bar achieved in 727 km.

Examples 5-8 have the same properties as examples 1-4, with example 5 corresponding with example 1, etc. the cracking pressure of the valve is higher for examples 5-8 as compared to 1-4. A slightly lower buffer volume is needed in examples 5-8 to achieve the same final tire pressure as examples 1-4. The higher cracking pressure also results in a significantly shorter distance to be traveled by the pump/tire in order to result in the final tire pressure. The volume ratios of the buffer volume to maximum pump volume may be used to determine a new buffer volume should the pump volume or cavity volume change. The buffer volume may be adjusted by rotating screw 66. The number of turns of the screw (e.g. 5 turns) would result in a distance of 4 mm with a screw pitch of 75 mm.

| Cracking Pressure | Cavity | | | Tire Volume | Initial Tire pressure | A Buffer Volume [mm3] | B Final Tire pressure | C Needed Distance | D Volumes Ratio |
| --- | --- | --- | --- | --- | --- | --- | --- | --- | --- |
| | Angle | Size | Volume [mm3] | | | | | | |
| 0.1 bar | 180 | 2 × 1 | 1036 | 38 L | 1.8 bar | 459 | 2.2 bar | 241 km | 0.443 |
| | 180 | 2 × 1 | 1036 | 38 L | 1.8 bar | 351 | 2.9 bar | 490 km | 0.339 |
| | 180 | 2.7 × 0.5 | 699.5 | 38 L | 1.8 bar | 310 | 2.2 bar | 355 km | 0.443 |
| | 180 | 2.7 × 0.5 | 699.5 | 38 L | 1.8 bar | 237 | 2.9 bar | 727 km | 0.339 |
| 0.3 bar | 180 | 2 × 1 | 1036 | 38 L | 1.8 bar | 422 | 2.2 bar | 137 km | 0.407 |
| | 180 | 2 × 1 | 1036 | 38 L | 1.8 bar | 329 | 2.9 bar | 324 km | 0.318 |
| | 180 | 2.7 × 0.5 | 699.5 | 38 L | 1.8 bar | 285 | 2.2 bar | 203 km | 0.407 |
| | 180 | 2.7 × 0.5 | 699.5 | 38 L | 1.8 bar | 222.5 | 2.9 bar | 485 km | 0.318 |

The maximum air pressure delivered by a peristaltic pump embedded in a tire can be fixed by setting the right volume of the pump tube and the buffer volume. The pump tube volume can be set by design with the dimensions of the tube sections and tube length. The buffer volume can also be set by design but can also be easily manually changed by the mean of a dedicated device or by interchanging appropriate parts before the valve. This can be implemented with either a set of tube with different lengths or a set of small tanks to be inserted before the valve.

Variations in the present invention are possible in light of the description of it provided herein. While certain representative embodiments and details have been shown for the purpose of illustrating the subject invention, it will be apparent to those skilled in this art that various changes and modifications can be made therein without departing from the scope of the subject invention. It is, therefore, to be understood that changes can be made in the particular embodiments described which will be within the full intended scope of the invention as defined by the following appended claims.

What is claimed is:

1. A self-inflating tire assembly comprising:
a tire mounted to a rim, the tire having a tire cavity, first and second sidewalls extending respectively from first and second tire bead regions to a tire tread region;
an air tube connected to the tire and being composed of a flexible material operative to allow a portion of the air tube near a tire footprint to substantially open and close the air tube,
a regulator device including a regulator body mounted in the tire sidewall, the regulator body having a first end located within the tire cavity, wherein the first end has an internal passageway that is in fluid communication with the tire cavity, said regulator device having a second end having an internal pump passageway for connecting to a first end of the air tube; a check valve in fluid communication with the internal passageway and the pump passageway, wherein the regulator device further comprises a channel located between the second end and the check valve, wherein the channel is in fluid communication with a buffer chamber.

2. The self-inflating tire assembly of claim 1 wherein the volume of the buffer chamber is adjustable.

3. The self-inflating tire assembly of claim 1 wherein the buffer chamber has an adjustable outer wall.

4. The self-inflating tire assembly of claim 1 wherein the buffer chamber is formed in a void formed by a threaded fastener mounted in a chamber.

5. The self-inflating tire assembly of claim 1 wherein the regulator device is in fluid communication with the tire cavity.

6. The tire assembly of claim 1, wherein the air tube is sequentially flattened by the tire footprint to pump air along the air passageway in either a forward tire direction of rotation or a reverse tire direction of rotation.

7. The tire assembly of claim 1, wherein a second end of the air tube and the regulator device are mounted substantially 180 degrees apart.

8. The tire assembly of claim 1, wherein a second end of the air tube and the regulator device are mounted substantially 360 degrees apart.

9. The tire assembly of claim 1, wherein the cross-sectional shape of the air tube is elliptical.

* * * * *